Aug. 25, 1942.   S. CERSTVIK   2,294,282
TEMPERATURE COMPENSATION FOR RATE OF CLIMB INDICATORS
Filed Oct. 30, 1940
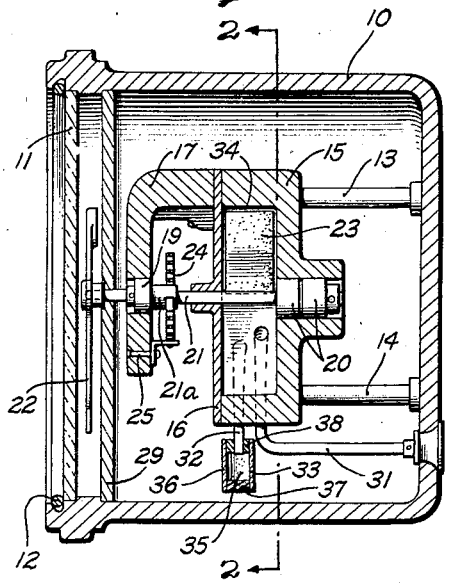
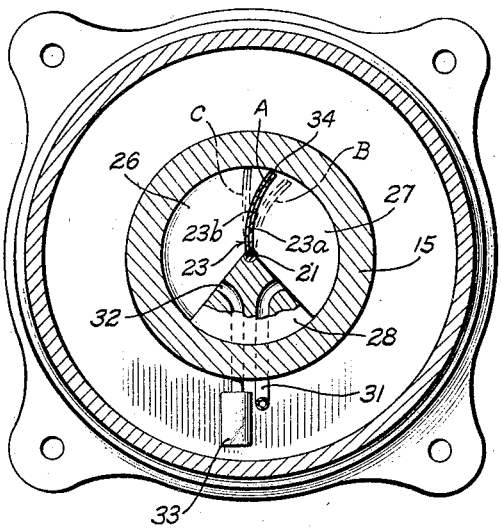
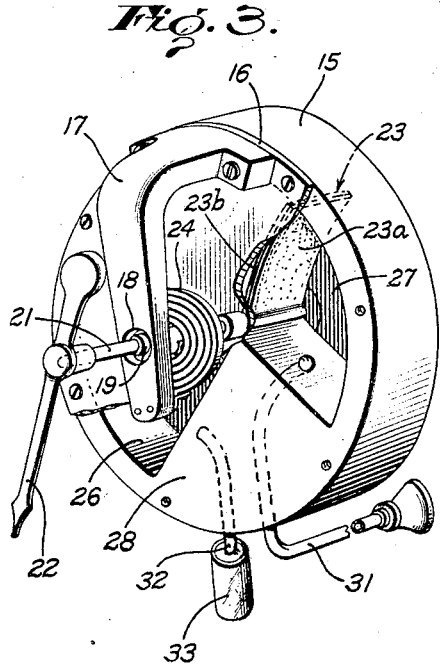
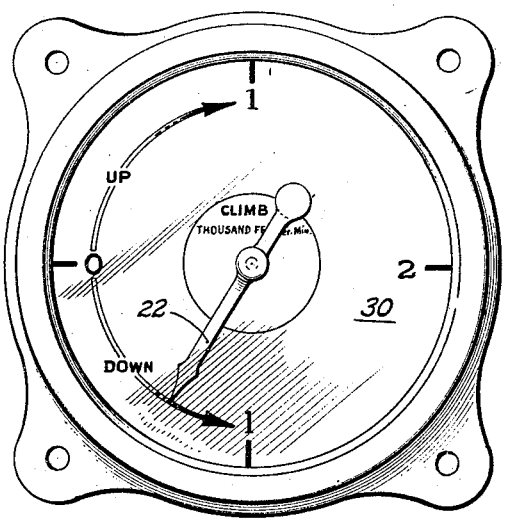
Inventor
Stephen Cerstvik.
By C. J. Kalman
Attorney Patented Aug. 25, 1942

2,294,282

UNITED STATES PATENT OFFICE 2,294,282

TEMPERATURE COMPENSATION FOR RATE OF CLIMB INDICATORS

Stephen Cerstvik, Newark, N. J., assignor to Bendix Aviation Corporation, Bendix, N. J., a corporation of Delaware Application October 30, 1940, Serial No. 363,573

5 Claims. (Cl. 73—179)

This invention relates generally to pressure responsive instruments and more particularly to rate of climb indicators of the "pressure vane" type for use in aircraft wherein a differential between the pressures outside and inside of the instrument, established by a change of one of the pressures, is utilized to operate an indicator and wherein communication between the outside and inside pressures is controlled so as to provide for equalization of the pressures when the condition causing the change has ceased to exist.

Rate of climb indicators of the "pressure vane" type are known in the art but these usually depend upon auxiliary sealed chambers or reservoirs such as "thermos bottles" by the use of which restricted flow is obtained between the outside and inside pressures thereby creating a pressure differential in response to which the rate of climb or descent is indicated. These structures are subjected to temperature errors for the reason that upon an increase or decrease in temperature surrounding the instrument the air flow through the restricted orifice to the "thermos bottle" is either retarded or increased, thereby decreasing or increasing the differential of the pressures within and outside of the instrument. Unless the differential of the pressures is maintained constant during constantly increasing or decreasing altitudes and varying temperatures, erroneous indication of the rate of climb or descent will be exhibited.

An object of the present invention is to provide novel temperature error compensating means for a rate of climb instrument of the "pressure vane" type.

Another object of the invention is to provide a novel rate of climb indicator of the "pressure vane" type, dispensing with the use of auxiliary pressure reservoirs, and having dependable temperature compensating means whereby the true rate of climb or descent will be indicated notwithstanding temperature variation.

A further object of the invention is to provide a compact novel rate of climb instrument having temperature responsive control means therefor whereby the communication between the outside and inside pressures of the instrument is so controlled that a substantially constant differential in the pressures will be maintained regardless of varying temperatures thereby providing an accurate temperature compensation.

Another object of the invention is to provide a novel rate of climb instrument in which the indicator responds instantly to rate of climb or descent and wherein the value indicated is the true rate of climb or descent unaffected by temperature changes.

Another object of the invention is to provide a novel rate of climb indicator of the "pressure vane" type wherein the vane constitutes a temperature compensating means so that a constant differential between the outside and inside pressures is maintained during climb or descent notwithstanding varying temperatures surrounding the instrument.

The above and further objects and novel features of the invention will more fully appear from the following detailed description when the same is read in connection with the accompanying drawing. It is to be expressly understood, however, that the drawings are for purposes of illustration only and are not intended as a definition of the limits of the invention, reference for the latter purpose being had to the appended claims.

In the drawing, wherein like reference characters refer to like parts, throughout the several views:

Figure 1 is a side elevation, in section, of a rate of climb indicator embodying the invention;

Figure 2 is a sectional view taken substantially along line 2—2 of Figure 1;

Figure 3 is a view in perspective of the rate of climb indicator of Figure 1, with the case removed; and Figure 4 is a front elevation view of the rate of climb indicator of Figure 1.

The novel rate of climb instrument comprises a case or housing 10 as clearly shown in Figure 1, having an open end thereof closed by means of a cover glass 11 securely held in place by means of a snap ring 12. Mounted within the case 10 by suitable means such as supporting rods 13 and 14 is a substantially hollow cylindrical member 15 defining a pressure chamber for the rate of climb instrument.

The open end of member 15 is normally closed by an apertured plate or cover 16 which is secured to member 15 in any suitable manner and held thereagainst by a bearing bracket 17 having an opening 18 provided with a bearing 19 which, together with bearings 20 mounted in the closed end of member 15, acts as bearing means for rotatably supporting a shaft 21 carrying a pointer or indicator 22 at one end thereof and a pressure vane 23 at the other end thereof. The vane 23 is normally urged in a predetermined position by a spring 24 anchored at one end to the enlarged portion 21a of shaft 21 and at its other end to the bearing bracket 17 by suitable means such as pins 25.

Shaft 21 passes through the aperture of cover 16 and the pressure vane 23 carried thereby is mounted for limited rotation within the pressure chamber of member 15 and divides the chamber into pressure chambers 26 and 27, respectively, as better shown in Figures 2 and 3.

Member 15 is provided internally with a sector shaped partition wall 28 which extends from the inner periphery of member 15 into close relation with the shaft 21. The partition wall 28 is so provided that it is opposite to the normal position of the pressure vane 23.

An air tight seal is effected for the part of the case 10 containing member 15 from the front part of the case by means of a plate 29 provided with an opening at its center for receiving the shaft 21. A dial 30 is provided for one side of plate 29 over which the pointer 22 is superimposed for movement.

The partition wall 28 is provided with a conduit or tube 31 which communicates at one end thereof with the atmosphere outside of the case 10 and at the other end thereof with the pressure chamber 27 of member 15, thereby communicating atmospheric pressure at all times to the interior of chamber 27. The pressure chamber 26, on the other hand, communicates with the pressure within the case 10 by way of conduit or tube 32 and a diffuser element 33, the purpose of the latter to appear hereinafter.

Shaft 21 is located at the center of the cylindrical member 15 and the pressure vane 23 is of such dimensions as to provide a small gap or clearance space 34 on all sides thereof between the walls of the interior of member 15 (Figure 1). Approximately the same clearance should be afforded between the shaft 21 and the partition wall 28.

In operation, as the craft, upon which the present novel rate of climb instrument is provided, ascends the altitude is increased and the surrounding pressure consequently decreased. The decreased pressure is instantly communicated to chamber 27 by way of conduit 31 and acts upon the related side of pressure vane 23. The pressure within case 10, however, cannot immediately equalize with the outside pressure due to the metered resistance offered by the diffuser element 33 and as the pressure within the case is greater than that within pressure chamber 27, the greater pressure will be contained in pressure chamber 26 and therefore the vane 23 is urged in a clockwise direction moving the pointer 22 against the tension of spring 24 over the dial 30 to indicate rate of climb which is proportional to the differential of the pressures existing within chambers 26 and 27.

When the craft levels off so that altitude change no longer takes place, flow continues from chamber 26 to 27 by way of clearance space 34 to thereby equalize the pressures whereupon the pointer 22 under the action of spring 24 returns to its normal position indicating zero rate of climb.

The reverse of the above operation obtains when the craft descends, thereby decreasing the altitude and proportionately increasing the surrounding pressures. The increased pressures are instantly communicated to pressure chamber 27 and as the pressures within the case 10 are smaller than those in chamber 27, the vane 23 is urged into counter-clockwise rotation thereby moving indicator 22 to indicate rate of descent.

In known instruments provided with "thermos bottles" having restricted connections to air flow, comprising either small orifices or capillary tubes, either "under reading" or "over reading" by the instrument results and this for the reason that during constant rate of climb the pressure differential of the outside and inside pressures either increases or decreases with altitude change. To obtain proper reading of rate of climb during varying altitudes the pressure differential between the outside and inside pressures must be maintained substantially constant and this is accomplished by the use of the diffuser element 33.

The diffuser element 33 may constitute a pressure chamber 35 enclosed by a cylindrical wall 36 of porous material, such as porcelain and an end plate 37 of the same composition while the opposite end is closed by means of an apertured cover 38 receiving conduit 32. The porosity and granular structure of the diffuser element 33 is so determined that the diffuser possesses the combined characteristics of both the orifice and the capillary tube in that during varying altitudes the diffusion is automatically controlled thereby maintaining a constant differential pressure during climb or descent thus permitting the pointer 22 to indicate the true rate of climb or descent unaffected by altitude errors. For a more detailed description of the structure and theory of operation of the diffuser element reference is made to the patent to Gregory V. Rylsky, No. 2,147,108, issued February 14, 1939.

In the foregoing, only altitude errors have been considered and their compensation described, whereby the instrument will indicate true rate of climb or descent. However, when the instrument case 10, during craft ascent or descent, is subjected to varying temperatures, a temperature error results. The latter error occurs for the reason that during sudden temperature increase air becomes "viscous" in the sense that its flow is retarded while under decreased temperatures the air flows more rapidly. To provide proper indication of the rate of climb, the pressure differential must remain substantially constant and, therefore, the error arising from temperature changes must be compensated.

One manner of accomplishing the desired compensation in accordance with the present invention is to vary the clearance space or gap 34 between the vane 23 and the inner periphery of member 15 in such a manner that the gap will be greater during high temperatures so as to provide a greater volume of air flow to compensate for the retarded air flow during increased temperatures, and during lower temperatures will have a minimum clearance space so as to restrict the air flow thereby compensating for the increased air flow at the lower temperatures.

Referring to Figure 2 of the drawing, there is shown one arrangement whereby the above result may be accomplished. The pressure vane 23 is made of temperature responsive material such as bimetal having differentially expanding and contracting elements 23a and 23b which during normal temperatures assume a slightly curved position as shown at A, Figure 2. When the case 10 is subjected to temperature rise the air flow through the clearance space 34 tends to decrease thereby tending to increase the pressure differential whereby "over reading" of the instrument would occur. Upon an increase in temperature, however, the temperature responsive pressure vane 23 assumes a new position B (Figure 2) and the greater clearance space 34 permits greater volume to pass from one side of the vane to the other compensating for the decreased air flow due to temperature rise and thus maintaining the pressure differential constant.

The reverse of the foregoing operation ensues when the case is subjected to temperature decrease; namely, the air flow is increased and the tendency would be to render "under reading." With decreased temperatures, however, the bimetallic vane 23 swings to the left or assumes a radial position C indicated in dotted lines in Figure 2, and since the clearance space 34 becomes a minimum, the volume of air flow is decreased and the pressure differential maintained substantially constant.

From the foregoing, it will now readily appear to those skilled in the art that a novel and dependable rate of climb instrument of the "pressure vane" type has been provided wherein with the provision of a novel temperature responsive means the pointer indicates true rate of climb or descent at all times undisturbed by temperature errors. The diffuser element 33 is placed in series with the vane 23 and provides the altitude error compensation, but the element of itself does not constitute the subject of the present invention but is disclosed and claimed in the above referred to Rylsky Patent No. 2,147,108.

Although but a single embodiment of the present invention has been illustrated and described in detail, it is to be expressly understood that the invention is not limited thereto. Various changes can be made in the design and arrangement of parts without departing from the spirit and scope of the invention, as will now be understood by those skilled in the art. For a definition of the limits of the invention, reference will be had primarily to the appended claims.

What is claimed is:

1. A rate of climb instrument for an aircraft comprising means providing a first chamber, means providing a second chamber, a pressure actuated bimetallic vane rotatably mounted in said second chamber, means normally urging said bi-metallic vane to a predetermined position, said second chamber being in communication with said first chamber at one side of said bimetallic vane and in communication with the atmosphere at the other side of said bimetallic vane whereby a differential in pressure occurs between the two sides of said bimetallic vane during changes in altitude, said bimetallic vane forming a clearance gap between an edge thereof and a wall of said second chamber whereby said vane is actuated in response to said pressure differential during altitude change and air is caused to flow through said gap to cause equalization of the pressures on the two sides of said bimetallic vane, said vane responding to a temperature rise to increase said clearance gap thereby increasing air flow therethrough and to decrease said clearance gap at a temperature fall to thereby decrease the air flow through said gap, and indicating means actuated by said bi-metallic vane.

2. A rate of climb indicator for an aircraft comprising means providing a first chamber, means providing a second chamber, a pressure actuated member movably mounted within said said second chamber, means normally urging said pressure member to a predetermined position, said second chamber being in communication with said first chamber at one side of said pressure member and in communication with the atmosphere at the other side of said pressure member whereby a differential in pressure occurs between the two sides of said pressure member during a change in altitude, said pressure member forming a capillary gap between an edge thereof and a wall of said second chamber whereby said pressure member is actuated in response to a pressure differential due to a change in altitude and air is caused to flow through said gap to cause equalization of pressures on the two sides of said pressure member, the air flow through said gap being retarded by an increased temperature and increased by a decreased temperature, said pressure member comprising means responsive to temperature change for increasing said gap at the increased temperature and decreasing said gap at the decreased temperature thereby providing compensation for errors due to temperature variation, and indicating means actuated by said pressure member.

3. A rate of climb indicator for an aircraft comprising means providing a first chamber, means providing a second chamber supported within said first chamber, a pressure actuated member rotatably mounted within said second chamber, means normally urging said pressure member to a predetermined position, said second chamber being in communication with said first chamber at one side of said pressure member and in communication with the atmosphere at the other side of said pressure member whereby a differential in pressure occurs between the two sides of said pressure member during a change in altitude, said pressure member forming a capillary gap between an edge thereof and a wall of said second chamber whereby said pressure member is actuated in response to a pressure differential due to a change in altitude and air is caused to flow through said gap to cause equalization of pressures on the two sides of said pressure member, the air flow through said gap being retarded by an increased temperature and increased by a decreased temperature, said pressure member comprising temperature responsive means for increasing said gas at the increased temperature and decreasing said gap at the decreased temperature thereby providing compensation for errors due to temperature variation, and indicating means actuated by said pressure member.

4. A rate of climb indicator for an aircraft comprising means providing a first chamber, means providing a second chamber supported within said first chamber, a pressure actuated bi-metallic vane rotatably mounted within said second chamber, means normally urging said bi-metallic vane to a predetermined position, said second chamber being in communication with said first chamber at one side of said bi-metallic vane and in communication with the atmosphere at the other side of said bi-metallic vane whereby a differential in pressure occurs between the two sides of said bi-metallic vane during a change in altitude, said vane forming a capillary gap between an edge thereof and a wall of said second chamber whereby said vane is actuated in response to a pressure differential due to a change in altitude and air is caused to flow through said gap to cause equalization of pressures on the two sides of said vane, said vane responding to a temperature rise to increase said gap thereby increasing air flow therethrough and to decrease said gap at a temperature fall to thereby decrease the air flow through said gap, and indicating means actuated by said bi-metallic vane.

5. A rate of climb responsive device for aircraft, comprising means providing a first chamber, means providing a second chamber, a pressure actuated member rotatably mounted within said second chamber, means normally urging said pressure member to a predetermined position, said second chamber being in communication with said first chamber at one side of said pressure member and in communication with the atmosphere at the other side of said pressure member, whereby a differential in pressure occurs between the two sides of said pressure member during a change in altitude of the aircraft, said pressure member forming a capillary gap between an edge thereof and the wall of said second chamber, whereby said pressure member is actuated in accordance with the rate of change of altitude of the aircraft in response to a pressure differential due to a change in altitude of said aircraft and air is caused to flow through said gap to cause equalization of the pressures on the two sides of said pressure member, the air flow through said gap being retarded by an increased temperature and increased by a decreased temperature, said pressure member comprising means responsive to temperature change for increasing said gap at the increased temperature and for decreasing said gap at the decreased temperature, thereby providing compensation for errors due to temperature variation, and means actuated by said pressure member.

STEPHEN CERSTVIK.